J. CONWAY.
WRENCH-NUT.

No. 171,353.                Patented Dec. 21, 1875.

Section at A B

Witnesses:                Inventor:

UNITED STATES PATENT OFFICE.

JESSE CONWAY, OF BALTIMORE, MARYLAND.

IMPROVEMENT IN WRENCH-NUTS.

Specification forming part of Letters Patent No. 171,353, dated December 21, 1875; application filed December 8, 1875.

*To all whom it may concern:*

Be it known that I, JESSE CONWAY, of Baltimore, Maryland, have invented a certain new and useful Wrench-Nut, of which the following is a specification:

The new article devised by me, and which I term a "wrench-nut," is designed to be used for the unscrewing or turning of bolts and other like articles of cylindrical form, such as pipes, &c. It is particularly adapted for use upon bolts in steam-engines and other machinery, and is intended to be employed in conjunction with a wrench of any ordinary construction, or with any tool or instrument which can take hold of the nut, and will afford the leverage required.

The nature of my invention, and the manner in which the same is or may be carried into effect, can best be explained and understood by reference to the accompanying drawing, in which—

Figure 1:
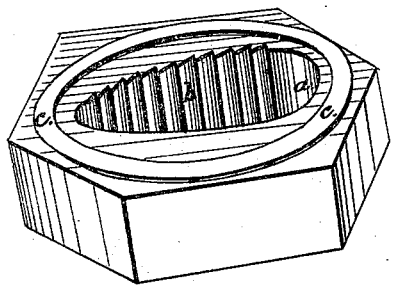
Figure 2:
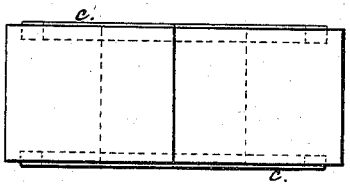
Figure 4:
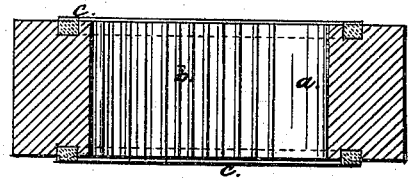
Figure 3:
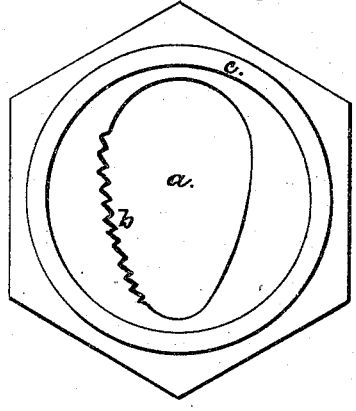

Figure 1 is a perspective view of the wrench-nut. Fig. 2 is a side elevation, and Fig. 3 is a plan, of the same. Fig. 4 is a section of the wrench-nut on line A B, Fig. 3.

The wrench-nut has the general shape of an ordinary nut; in this case it is hexagonal. Through it is formed an oblong opening, $a$, widest at one end, and thence tapering to the other end. This opening is designed to fit bolts or rods of varying sizes. One side of the opening is formed with serrations or inclined teeth $b$, or is roughened or equivalently formed, in order to enable the nut to take a firm hold on the rod or bolt to which it is applied.

The nut, when used, is fitted onto the bolt to be turned, and is then taken hold of by a wrench or other instrument, moved to such a position that the two sides of the opening $a$ will jam or wedge against the bolt, and then turned in one direction or the other, according to circumstances. Under these conditions the teeth $b$ will take a firm hold on the bolt, so that the nut cannot slip.

The nut is applied to the bolt with one face or the other uppermost, in accordance with the direction in which the bolt is to be turned, this being rendered necessary by the inclination of the teeth.

In order to prevent the hard material of which the nut is composed from scratching or injuring any smooth or polished surface with which either of its faces may be brought in contact, I apply to each face of the nut a washer or annulus, $c$, of copper or other suitable comparatively soft metal, which projects a little from the face of the nut, and so prevents the latter from touching the surface liable to be injured by such contact.

What I claim, and desire to secure by Letters Patent, is—

1. The wrench-nut having the external configuration of a nut, and formed with an oblong tapering opening, one or both sides of which are serrated or equivalently formed, substantially as set forth.

2. The combination, with the wrench-nut, of soft-metal washers or projections, applied to the faces of the nut, substantially as and for the purposes set forth.

In testimony whereof I have hereunto signed my name this 7th day of December, A. D. 1875.

JESSE CONWAY.

Witnesses:
A. POLLOK,
EWELL A. DICK.